United States Patent [19]

Smith

[11] Patent Number: 6,041,348
[45] Date of Patent: Mar. 21, 2000

[54] N-PORT ALGORITHM FOR DISABLING A NODE WITHIN A NETWORK DURING RESET

[75] Inventor: Michael B. Smith, Etobicoke, Canada

[73] Assignee: LSI Logic Corporation, Milpitas, Calif.

[21] Appl. No.: 08/982,263

[22] Filed: Dec. 1, 1997

[51] Int. Cl.$^7$ ............................. G06F 13/00; G06F 15/00; G06F 11/00; G06F 1/24
[52] U.S. Cl. ......................... 709/220; 709/238; 709/248; 709/227; 709/239; 370/94.3; 370/94.1; 370/60; 370/61; 395/860; 710/40
[58] Field of Search .................................. 709/220, 248, 709/227, 238, 239, 218, 221, 222, 249, 253; 710/40; 370/400, 250–60, 94.3, 94.1, 61, 254; 395/860

[56] References Cited

U.S. PATENT DOCUMENTS

| | | | |
|---|---|---|---|
| 5,138,615 | 8/1992 | Lamport et al. | 370/400 |
| 5,394,556 | 2/1995 | Oprescu | 709/220 |
| 5,630,173 | 5/1997 | Oprescu | 710/40 |
| 5,724,517 | 3/1998 | Cook et al. | 709/227 |
| 5,784,557 | 7/1998 | Oprescu | 709/220 |
| 5,784,648 | 7/1998 | Duckwall | 710/40 |
| 5,802,289 | 9/1998 | Oprescu | 709/248 |

OTHER PUBLICATIONS

Newton's Telecom Dictionary, Newton, Harry, 14th Ed. Flariton Publisher, Mar. 1998.
EPO No. 00485260: Bridge–Like Internet Protocol Router, Perlman, Radia Joy, et al., Jul. 1, 1991.

Primary Examiner—Frank Asta
Assistant Examiner—Beatriz Prieto
Attorney, Agent, or Firm—Riches, McKenzie & Herbert

[57] ABSTRACT

A device and method to control a node within a network is disclosed. The node can have any number of ports N where N is an integer greater than one. The device has N-port modules, corresponding to the number of ports in the node, each port module associated with one port for controlling reception and transmission of information through the associated port. The port modules are substantially identical and the device can be manufactured by replicating N-port modules, one port module for each port. The port modules have a priority within the node. The priority can be created by connecting the port modules in a daisy chain configuration. The port module having the highest priority compares the unique identifier of the node with the unique identifier being received by the port associated with the highest priority port module. The results of this comparison are sent to the next highest priority port module. The port modules compare, in a predetermined priority, the unique identifier being received by the associated port with the unique identifier having been sent by the previous port modules. This continues until all of the port modules have agreed upon a unique identifier which satisfies a set of predetermined conditions. Once the port modules have all determined that an identically unique identifier satisfies the predetermined conditions, the device disables ports which are receiving this identical unique identifier from the root node until only one port in the node is receiving this unique identifier from the root node.

26 Claims, 4 Drawing Sheets

N-PORT ALGORITHM FOR DISABLING A NODE WITHIN A NETWORK DURING RESET

FIELD OF THE INVENTION

This invention relates to an algorithm for converting an arbitrary graph to an acyclic graph. More particularly, the invention relates to a process and device for implementing an algorithm to convert an arbitrary graph, representing nodes in a network, to an acyclic graph by identifying ports in the nodes which can be disabled. The acyclic graph is formed by activating the ports which have not been identified as ports which can be disabled.

BACKGROUND OF THE INVENTION

Processes and devices for disabling ports in a network have been used in the past to traverse arbitrary graphs and convert the arbitrary graphs into acyclic graphs. However, all of these prior art processes and methods implement algorithms which are dependent on the number of ports the node has. In other words, the prior art processes and methods require that the number of ports each node has be fixed. For example, the prior art processes and methods would have a different algorithm for arbitrary graphs having 3-ported nodes as opposed to arbitrary graphs having 5-ported nodes.

Accordingly, the prior art methods and devices suffer from the disadvantage that a plurality of different methods and devices, each implementing an algorithm for nodes having a fixed number of ports, are required in order to solve arbitrary graphs having nodes with a different number of ports. In other words, it is necessary to implement a different algorithm for a 3-ported node as opposed to a 5-ported node. This increases the cost and complexity of designing chips for networks because a plurality of different devices and chip designs are required to satisfy nodes having a different number of ports.

A further disadvantage of the prior art is that if a process and device to implement an algorithm for an arbitrary graph having a specific number of ports per node was not available, it is necessary to "over design" for the arbitrary graph by implementing algorithms to solve the next largest number of ports on the node. For example, if only methods and devices for 3-ported nodes and 5-ported nodes have been designed, but a node has 4 ports, the algorithm for the 5-ported node would be implemented because no algorithm for a 4-ported node has been designed. While the algorithm for the 5-ported node arbitrary graph would operate for a 4-ported node arbitrary graph, there would be an unnecessary cost in having elements to implement the algorithm for the 5-ported node when a device implementing a 4-ported node algorithm would suffice. In addition, more space would be required on a chip to implement an algorithm for a 5-ported node arbitrary graph rather than an algorithm for a 4-ported node arbitrary graph, thereby decreasing the available space or real estate on the chip for other uses.

SUMMARY OF THE INVENTION

Accordingly, it is an object of this invention to at least partially overcome the disadvantages of the prior art. Also, it is an object of this invention to provide an improved type of process and method which implements an algorithm for an N-ported acyclic graph, where N is not fixed, but is an integer greater than or equal to one. It is also an object of the present invention to provide a process and device which implements identical logical steps for each port in a node to convert an arbitrary graph to an acyclic graph regardless of the number of ports in each node.

Accordingly, in one of its aspects, this invention resides in a computer network comprising a plurality of interconnected nodes, each node having ports for receiving and transmitting information to ports of other nodes, the ports in each node having a priority, each node in the network having a unique identifier which is transmitted by each node during reset of the computer network, a process for identifying which ports in one of the nodes can be disabled during reset of the network, said process comprising the steps of: (a) for each port in said one of the nodes, commencing with the port having the highest priority in said one of the nodes; (i) determining, between a predetermined unique identifier and a unique identifier being received by the port from other nodes, which unique identifier satisfies a first set of predetermined conditions; (ii) transmitting, from the port to other nodes, the unique identifier which has been determined satisfies the first set of predetermined conditions for the port; (iii) sending to the next highest priority port in the node the unique identifier which has thus far been determined to satisfy the first set of predetermined conditions; (iv) determining, between the unique identifier sent from the higher priority port of said one of the nodes and a unique identifier being received by the next highest priority port of said one of the nodes, which unique identifier satisfies the first set of predetermined conditions; and (v) repeating steps (ii) to (iv) for each port in said one of the nodes in the order of priority until each port of said one of the nodes is transmitting an identical unique identifier number that satisfies the first set of predetermined conditions, said identical unique identifier being transmitted by each port corresponding to a root node of the plurality of nodes; (b) for each port that is receiving the identical unique identifier from the root node, disabling one of the ports receiving the identical unique identifier from the root node.

In a further aspect, this invention resides in a device for controlling a node, said node being one node in a computer network comprising a plurality of interconnected nodes, each node in the network having ports for receiving and transmitting information to ports of other nodes, each node in the network having a unique identifier which each node transmits during reset of the computer network, said node having N-ports where N is an integer greater than or equal to one, said device comprising: N-port modules, each port module associated with one port of the node for controlling reception and transmission of information through the associated port to other nodes, each port module in the node having a predetermined priority commencing with a highest priority port module; wherein, upon occurrence of an event causing the node to reset, the port module having the highest predetermined priority compares a predetermined unique identifier to the unique identifier being received by its associated port to determine which unique identifier satisfies a first set of predetermined conditions; wherein the highest priority port module sends to the port module having the next highest priority the unique identifier which the highest priority port module has determined satisfies the first set of predetermined conditions; wherein each port module, in the predetermined priority, successively compares the unique identifier being received by the port associated with the port module to a unique identifier which has been previously determined by the port modules to satisfy the first set of predetermined conditions; and wherein the port modules repeatedly compare, in the predetermined priority, the unique identifier received by their associated ports with the unique identifier which has been previously determined to satisfy the first set of predetermined conditions, until all the port modules have determined an identical unique identifier which satisfies the first set of predetermined conditions, said identical unique identifier corresponding to a root node of the plurality of nodes.

In a further aspect, this invention resides in a computer network comprising a plurality of interconnected nodes, each node having ports for receiving and transmitting information to ports of other nodes, the ports in each node having a priority, each node in the network having a unique identifier which is transmitted by each node during reset of the computer network, a process for identifying which ports in a node can be disabled while maintaining an active connection between each node in the network, said process comprising the steps of: (a) for each node, (i) determining, between the unique identifier of the node and a unique identifier being received by the highest priority port from other nodes, which unique identifier satisfies a first set of predetermined conditions; (ii) transmitting from the port to other nodes the unique identifier which has been determined satisfies the first set of predetermined conditions; (iii) sending to the next highest priority port in the node the unique identifier which has thus far been determined to satisfy the first set of predetermined conditions; (iv) determining, between the unique identifier sent from the higher priority port of the node and a unique identifier being received by the next highest priority port of the node, which unique identifier satisfies the first set of predetermined conditions; and (v) repeating steps (ii) to (iv) for each port in the order of priority until each port of the node is transmitting an identical unique identifier number that satisfies the first set of predetermined conditions; (b) for each node, repeating step (a) until an identical unique identifier is transmitted by each port of each node, said identical unique identifier being transmitted by each port of each node corresponding to a root node of the plurality of nodes; and (c) for each node that is receiving the identical unique identifier from the root node by more than one port, disabling ports receiving the identical unique identifier from the root node until only one port in each node is receiving the identical unique identifier from the root node.

One advantage of the present invention is that the process and method according to the present invention can be implemented to convert any arbitrary graph into an acyclic graph regardless of the number of ports in each node of the acyclic graph. In this way, a single device and process need be used, regardless of the number of differently ported nodes which may need to be designed. The device can simply be duplicated for each port of each node, regardless of the number of ports or nodes, making the device and process according to the present invention very versatile.

In this way, a single process and device can be used regardless of the number of ports on a node and the different arbitrary graphs which may be encountered. This results in an efficiency and cost savings in designing nodes having different numbers of ports.

Furthermore, regardless of the different numbers of ports on each node, a device for the specific number of ports on each node can be produced. This further decreases the cost of the overall product by eliminating the requirement to "over design" for any particular number of ported nodes. This also eliminates unnecessary gateways and logic circuits on a chip or board, thereby increasing the available area or real estate on a chip or board for use by other devices.

A still further advantage of the present invention is that, by using a common device or core that implements a versatile and expandable algorithm which is independent of the number of ports on each node, the same device or core can be duplicated for each port on each node. This decreases the time and effort required to design chips for networks having a different number of ports on each node because the same core can be used for each port on each node.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
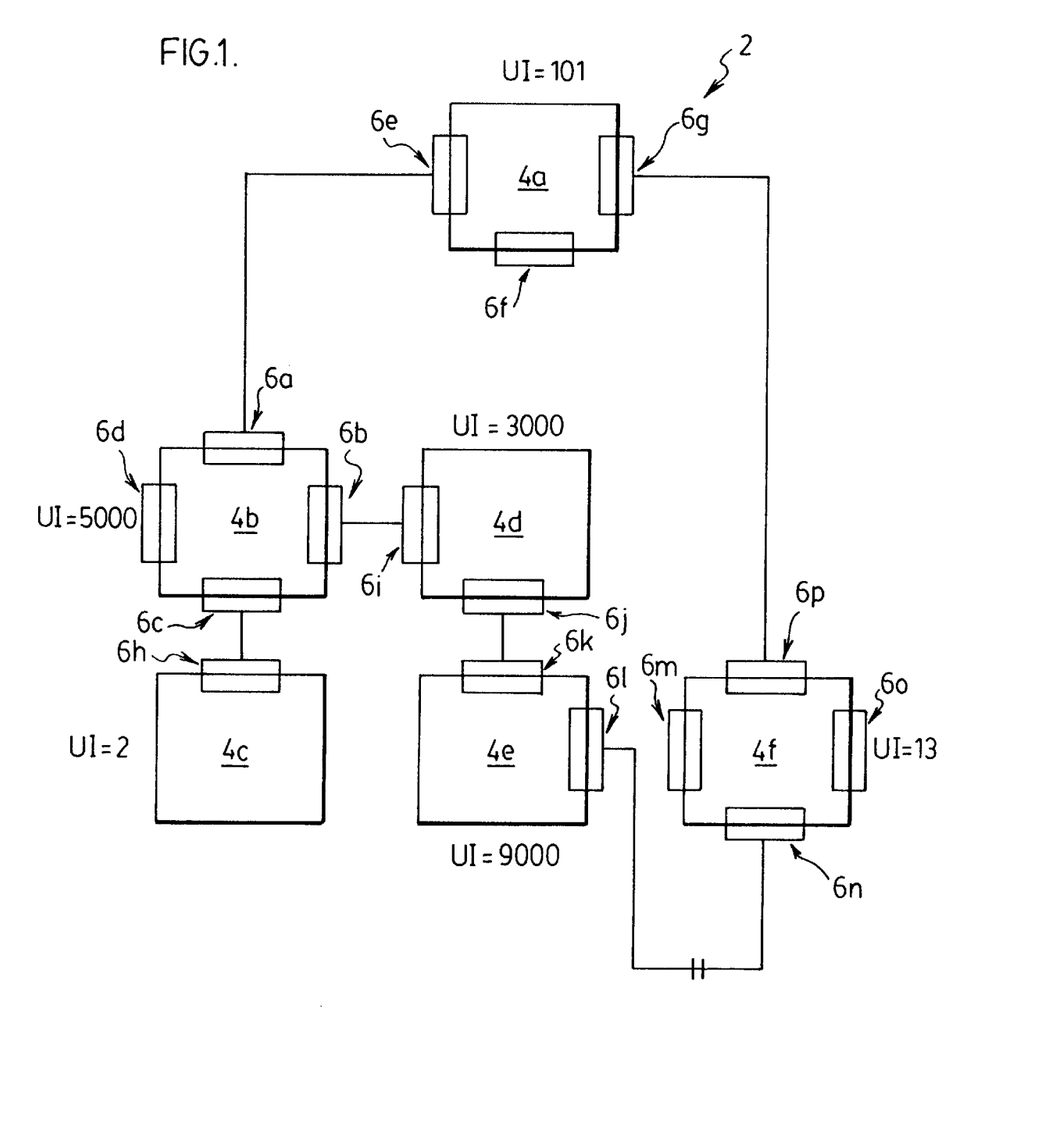
FIG. 1 shows an arbitrary graph of a computer network comprising a plurality of nodes.

FIG. 1 shows an arbitrary graph for a computer network, shown generally by reference numeral 2. The computer network 2 comprises a plurality of nodes, shown by reference numerals 4a to 4f. Each node 4a to 4f has a unique identifier, which in the embodiment shown in FIG. 1, comprises a number, namely the numbers 101, 5000, 2, 3000, 9000 and 13, respectively.

Each node 4a to 4f has ports, shown by reference numerals 6a to 6p for receiving and transmitting information between the nodes 4a to 4f. Each node 4a to 4f can have any number of ports. For example, node 4a has three ports, namely 6e, 6f, 6g and node 4e has two ports, namely 6k and 6l. In general, the nodes can have N-ports where N is an integer greater than or equal to one.

The term "node" in this context is used in its general sense to refer to any device which is connected to the computer network 2 and is capable of communicating with other network devices connected to the computer network 2. For example, the nodes 4a to 4f can be computer terminals, printers or other electronic devices capable of communicating with other devices connected to the computer network 2.

Standards for communication across computer networks, such as computer network 2, have been set in the past. These standards determine the method of communication between the nodes 4a to 4f. For example, in a preferred embodiment, the present invention relates to a computer network 2 which satisfies the requirements of the IEEE 1394.2 specification dated May 3, 1997 and incorporated herein by reference. The invention will now be described on the basis that the computer network 2 and the nodes 4a to 4f adhere to the IEEE 1394.2 specification. Nevertheless, it is understood that the present invention can operate in any type of computer network 2 which has certain common characteristics, such as that the nodes 4a to 4f have a unique identifier and that each node 4a to 4f transmits its unique identifier upon reset or restart.

The computer network 2 shown in FIG. 1 forms an arbitrary graph showing all electrical connections between the nodes 4a to 4f. During reset, redundant cable connections between nodes 4a to 4f can be detected and electronically disabled by bypassing the affiliated ports 6a to 6p. Algorithms for detecting and electronically disabling the nodes 4a to 4f are known in the art, such as the algorithms disclosed in the IEEE 1394.2 specification. In general, a port 6a to 6p is disabled by changing its state to IDLED. By disabling and bypassing affiliated ports, the arbitrary graph shown in FIG. 1 can be converted to an acyclic graph.

Such algorithms generally identify a root node whose unique identifier number satisfies predetermined conditions. The predetermined conditions can be any type of conditions to determine the root node, such as the highest unique identifier in the computer network 2, the lowest unique identifier in the computer network 2 or the unique identifier closest, without exceeding a particular value.

The IEEE 1394.2 specification identifies the root node as the node whose unique identifier has the largest value. Using this algorithm, node 4e in FIG. 1 would be identified as the root node since the unique identifier for node 4e, namely 9000, is the largest of the unique identifiers for the other nodes 4a, 4b, 4c, 4d and 4f shown in FIG. 1.

Implementing the network reset algorithm described in the IEEE 1394.2 specification on the arbitrary graph shown in FIG. 1 would cause one of the ports for node 4f to become disabled, such as port 6n. This is illustrated in FIG. 1 by the parallel lines though the connection between nodes 4e and 4f. By disabling port 6n, affiliated port 6l on node 4e also becomes disabled, and the arbitrary graph shown in FIG. 1 becomes an acyclic graph. When necessary, such as after a cable failure, or removal of or addition of a node to the computer network 2, a reset of the computer network 2 will re-occur, which could reactivate a disabled link. Therefore, looped cable topologies, such as that shown in FIG. 1, are desirable to increase the fault tolerance of the computer network 2. However, looped cable topologies must be electronically converted to acyclic topologies at reset in order for the computer network 2 to properly operate.

Figure 2:
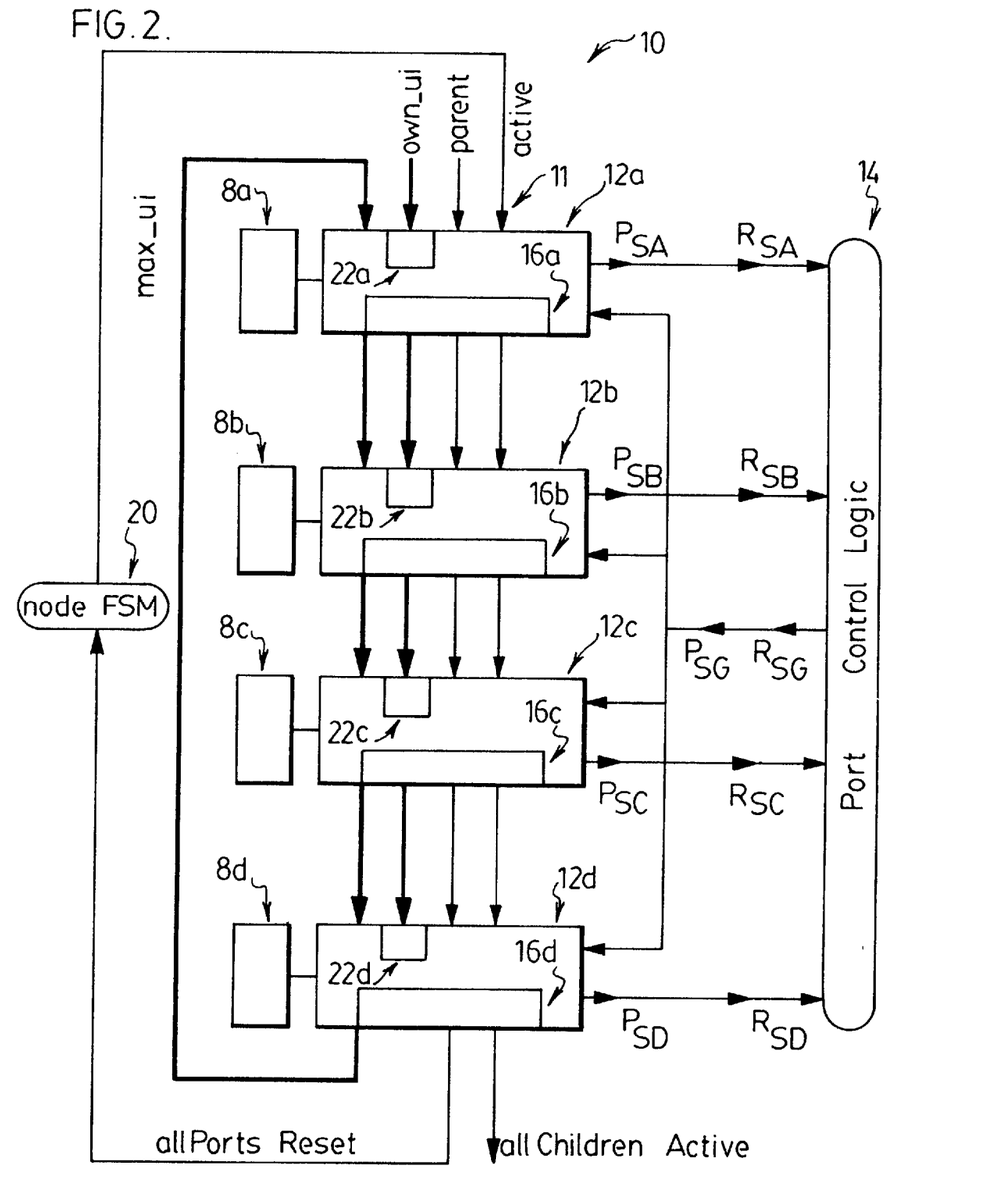
FIG. 2 shows a top-level architecture of a 4-port implementation of a device according to one embodiment of the present invention.

FIG. 2 shows a device, shown generally by reference numeral 10, for controlling a node, such as any one of nodes 4a to 4f shown in FIG. 1. The device 10 need not be used in each of the nodes 4a to 4f. However, each of the nodes 4a to 4f should adhere to common network protocols as discussed above. Also, the device 10 will be described on the basis that the device 10 will comply with the IEEE 1394.2 specification, but the device 10 could be implemented in any type of network having common characteristics.

As shown in FIG. 2, the device 10 controls a node having 4 ports, namely ports 8a, 8b, 8c, 8d. The device 10 comprises port modules 12a, 12b, 12c and 12d, each port module 12a to 12d being associated with one port 8a, 8b, 8c, 8d, respectively, for controlling reception and transmission of information through the associated port 8a to 8d.

For the purposes of illustration, the device 10 will be considered installed in and controlling node 4b shown in FIG. 1. Node 4b of FIG. 1 is a 4-ported node and ports 8a to 8d of FIG. 2 will be considered to correspond to ports 6a to 6d, respectively, of node 4b.

In a preferred embodiment, the port modules 12a to 12d comprise state machines which have states reflecting the states which the associated ports 8a to 8d must have so that the node can transmit and receive information in the computer network 2. These states will correspond to the states specified in the IEEE 1394.2 specification and comprise:

IDLED 25 Port is disabled
RESET 35 Port is going through reset transition
PARENT 45 Port is a parent to other nodes
CHILD 55 Port is a child of another node
SIBLING 65 Port is a sibling of another node
ACTIVE 75 Normal traffic can traverse the port While the device 10 shown in FIG. 2 is used to control a node having four ports 8a to 8d, it is understood that the device 10 can be used to control a node having any number of ports, such as N-ports where N is an integer greater than or equal to one, simply by providing a port module 12 for each port 8 in the node. In other words, when manufacturing or designing device 10 for a node having N-ports, the device 10 can be formed by replicating N substantially identical port modules 12, one port module 12 for each port of the node to be controlled. Each port module 12 will implement substantially identical logical steps to control each port and to convert an arbitrary graph to an acyclic graph regardless of the number of ports in each node.

The port modules 12a to 12d have a predetermined priority. In the embodiment shown in FIG. 2, port module 12a has the highest priority and the priority decreases through port modules 12b and 12c, to port module 12d which has the lowest priority. In the preferred embodiment shown in FIG. 2, the predetermined priority of the port modules 12a to 12d is determined by the orientation by the port modules 12a to 12d in a daisy chain, shown generally by reference numeral 11. The daisy chain 11 is used to send and receive information, including the signals max_ui, own_iu, representing unique identifiers, and the parent and active control signals through the port modules 12a to 12d in the predetermined priority. The ports 8a to 8d also have a priority which corresponds to the priority of the associated port module 12a to 12d.

The device 10 further comprises port control logic 14. The port control logic 14 sends and receives control signals, including the portStable signals $P_{SA}$, $P_{SB}$, $P_{SC}$ and $P_{SD}$ and reset signals $R_{SA}$, $R_{SB}$, $R_{SC}$ and $R_{SD}$ from each of the port modules 12a, 12b, 12c, 12d, and sends global signals, such as the global allStable signal $P_{SG}$ and the global reset signal $R_{SG}$ to each of the port modules 12a, 12b, 12c, 12d. Each port module 12a to 12d can also send a seenActive [N] signal, (not shown) which indicates one of the ports 8a to 8d has seen an incoming activation packet. In this way, the port control logic 14 coordinates and synchronizes the port modules 12a to 12d to ensure that the port modules 12a to 12d execute state transitions together and after all of the port modules 12a to 12d have exchanged all necessary information.

The reset signals $R_{SA}$, $R_{SB}$, $R_{SC}$ and $R_{SD}$ can be any type of signals which indicate to the port control logic 14 the occurrence of an event causing the node 4b to reset. For example, the reset signals $R_{SA}$, $R_{SB}$, $R_{SC}$ and $R_{SD}$ can comprise a seenReset [N] signal, which indicates that port N (one of ports 8a to 8d) has seen an incoming reset packet from another node 4a, 4c to 4f or restart, which indicates that all ports 8a to 8d must return to the RESET state 35 due to changes in the value of max_ui.

During operation, upon the occurrence of an event which causes the node 4b within which the device 10 is located to reset, the port module having the highest predetermined priority which, in the embodiment shown in FIG. 2, is port module 12a, compares a predetermined unique identifier to the unique identifier being received by its associated port 8a to determine which unique identifier satisfies a first set of predetermined conditions. In a preferred embodiment where the device 10 is operated in a network which adheres to the IEEE 1394.2 specification, the predetermined unique identifier will be the unique identifier of the node 4b within which the device 10 is located. This is represented in FIG. 2 by the signal own_ui entering into port module 12a. Also, in this preferred embodiment, the first set of predetermined conditions will be which unique identifier has the highest value. In other words, the highest priority port module 12a will compare its own unique identifier own_ui with the unique identifier being received by the port 8a to determine which unique identifier has the highest value. The highest priority port module will send to the port module having the next highest priority, in this case port module 12b, the unique identifier which the highest priority port module 12a has determined satisfies this first set of predetermined conditions.

In this example, where the device 10 is located within node 4b of FIG. 1, the highest priority port module 12a would be comparing its own_ui of 5000 to the unique identifier 101 received from port 6e of node 4a. The results of this comparison, namely the value 5000, which is the larger of 5000 and 101 and is the unique identifier value 5000 for node 4b, will be passed on to the next highest port module 12b. Port module 12b is associated with port 8b in FIG. 2 and corresponds to port 6b in FIG. 1. Therefore, the port 8b will be receiving the unique identifier being transmitted by port 6i of node 4d in FIG. 1.

Initially, port 6i will be transmitting the unique identifier 3000 corresponding to node 4d. However, because node 4d is connected to node 4e which has the unique identifier 9000, port 6i will eventually commence transmitting unique identifier 9000 corresponding to node 4e. For the purposes of this example, it will be assumed that port 4d has already determined that the unique identifier for node 4e is larger and is transmitting the unique identifier 9000 corresponding to node 4e. Therefore, port module 12b will make a comparison between the unique identifier which has been previously determined to satisfy the first set of predetermined conditions, namely the value 5000, which will be represented by the max_ui signals sent by port module 12a to port module 12b, and the unique identifier 9000 being received through port 8b. Port 8b will then commence transmitting the unique identifier which port module 12b has determined satisfies the first set of predetermined conditions, namely the value 9000 in this example. Port module 12b will then send the max_ui signals to the next highest priority port, namely to port module 12c, which represents the value 9000, which is the unique identifier that has been previously determined to satisfy the first set of predetermined conditions.

Each port module 12a to 12d, in the predetermined priority, will successively compare the unique identifier being received by its associated ports 8a to 8d, respectively, with a unique identifier which has been previously determined by one of the port modules 12a to 12d to satisfy the first set of predetermined conditions.

Each port module 12a to 12d comprises a communication unit 16a, 16b, 16c, 16d for sending to a next port module 12a to 12d in the predetermined priority the signals max_ui which represent the unique identifier that the preceding port module 12a to 12d has determined satisfies the first set of predetermined conditions. The lowest priority module, corresponding to 12d in the embodiment shown in FIG. 2, sends the signals max_ui which represent the unique identifier it has determined satisfies the first set of predetermined conditions to the highest priority port module, namely port module 12a in the embodiment shown in FIG. 2. In this way, the port modules 12a to 12d can repeatedly compare, in the predetermined priority, the unique identifiers being received by their associated ports 8a to 8d with the unique identifier which has been previously determined to satisfy the first set of predetermined conditions and which is represented by the signals max_ui.

Each port module 12a to 12d will cause its associated port 8a to 8d to transmit the unique identifier which the port module 12a to 12d has determined satisfies the first set of predetermined conditions. In this example, after the first pass through the port modules 12a to 12d, port module 12a will transmit unique identifier 5000 and port modules 12b to 12d will transmit unique identifier 9000. The port modules 12a to 12d will repeatedly compare, in the predetermined priority, the unique identifier received by the associated ports 8a to 8d with the unique identifier which has been previously determined to satisfy the first set of predetermined conditions, represented by the max_ui signals, until all of the port modules 12a to 12d have determined an identical unique identifier number, which satisfies the first set of predetermined conditions. In the embodiment shown in FIG. 1, this will correspond to the value 9000. Since 9000 is the unique identifier for node 4e, this node 4e will be the root node for this example.

Each port module 12a to 12d will become stable when the unique identifier being received by the port module 12a to 12d is the same as the unique identifier being sent. For example, if port module 12c receives from its higher priority port module 12b and sends to the lower priority port module 12d the same unique identifier, then port module 12c will be stable. When port module 12c becomes stable, port module 12c sends its port stable signal $P_{SC}$ to the port logic unit 14. Once each of the port modules 12a to 12d is stable, the port control logic 14 will be receiving all of the port stable signals $P_{SA}, P_{SB}, P_{SC}, P_{SD}$ from each port module 12a to 12d, respectively, at the same time. In response thereto, the port control logic 14 sends a global allStable signal $P_{SG}$ to all of the port modules 12a to 12d. The allStable signal $P_{SG}$ indicates to all of the port modules 12a to 12d that all of the port modules 12a to 12d have determined an identical unique identifier which satisfies the first set of predetermined conditions and all of the port modules 12a to 12d are stable. This is illustrated in the following statement:

allStable=portStable[0] AND portStable[1] AND . . . AND portStable [N]

The states of the port modules 12a to 12d are frozen until they receive the allStable signal $P_{SG}$. This ensures that all port modules 12a to 12d have complete knowledge of all unique identifiers being received by the node, and are in agreement as to the unique identifier of the root node before any of the port modules 12a to 12d change states. If any port module 12a to 12d becomes unstable, then all of the state machines of the port modules 12a to 12d are again frozen in their current state until the max_ui again stabilizes, the port modules 12a to 12d stabilize, and the port control logic 14 again sends the allStable signal $P_{SG}$.

Once the port control logic 14 sends the allStable signal $P_{SG}$, the parent signal and the active signal can then propagate through the port modules 12a to 12d in the predetermined priority. This is accomplished through the daisy chain 11 of the parent signal and the active signal as shown in FIG. 2. As the parent signal propagates through the port modules 12a to 12d, the states of the port modules 12a to 12d can change. The port modules 12a to 12d will also send out or receive computer network 2 control signals, such as a network parent signal, to other nodes 4a, 4c, 4d, 4e, 4f in the computer network 2, as disclosed in the IEEE 1394.2 specification, so that all ports 6a to 6p will have the proper state. At this time, two or more ports in a node 4a to 4f are receiving the identical unique identifier from the root node 4e, then the ports will be disabled to convert the graph to an acyclic graph. It is understood that not all of the ports 6a to 6p of all the nodes 4a to 4f need become disabled. For example, if any one of the ports 6a, 6e, 6g, 6p, 6n, 6l, 6k, 6j, 6i or 6b becomes disabled, the computer network 2 will become an acyclic graph. Which one of the these ports becomes disabled will be a function of several factors such as the topology of the computer network 2 and the priority of each port 6a to 6p within the nodes 4a to 4f. For example, each time a node 4b has two or more nodes 6a to 6d receiving the identical unique identifier from the root node 4e, the node 4b will not necessarily disable one of the ports 6a to 6d because another node, such as node 4f, may disable one of its ports 6p or 6n first such that node 4b will no longer be receiving the identical unique identifier from the root node 4e through its two ports 6a and 6b.

Figure 3:
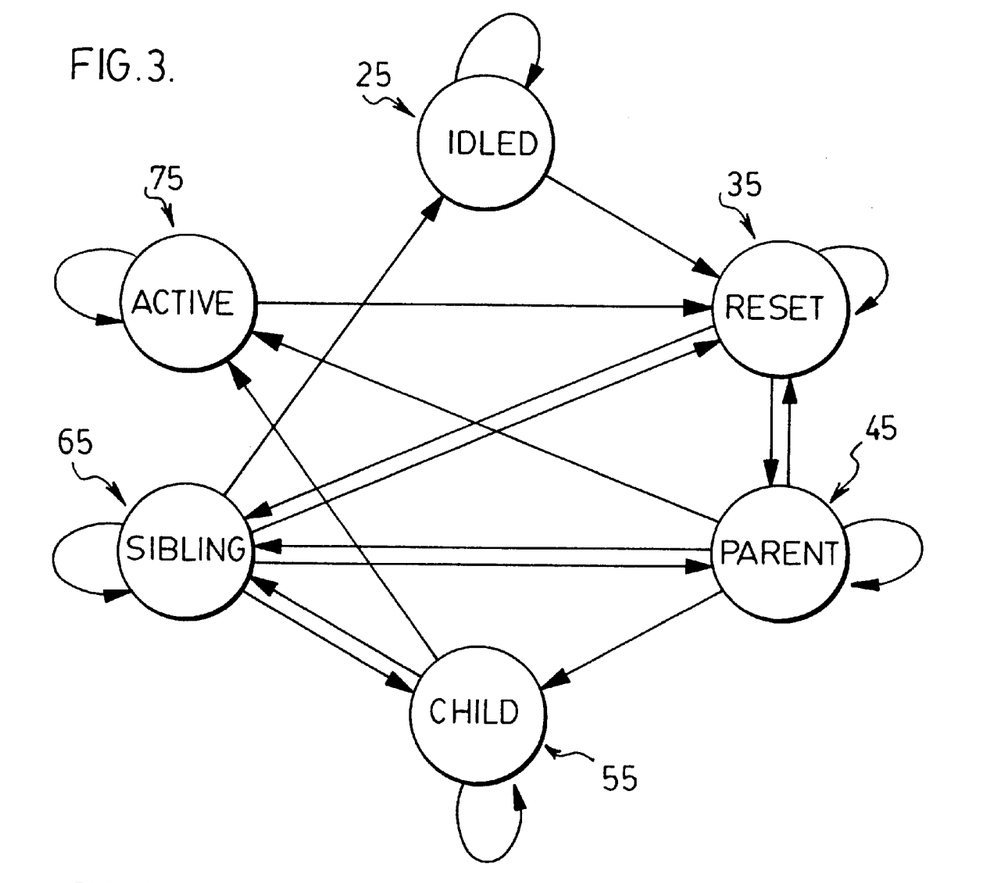
FIG. 3 shows a finite state machine algorithm for each port module according to one embodiment of the present invention.

As stated above, the port modules 12a to 12d comprise state machines which reflect the state the associated ports 8a to 8d must have so that the node can transmit and receive information through the corresponding ports 8a to 8d. If the IEEE 1394.2 specification is adhered to, the states of the port modules 12a to 12d will change as illustrated in FIG. 3 and as described below:

```
ACTIVE
    →   RESET       doReset
    →   ACTIVE      ! doReset
IDLED
    →   RESET       doReset
    →   IDLED       ! doReset
RESET
    →   RESET       ! allStable
    →   PARENT      parentIn&& ! nextParentOut
    →   CHILD       allPortsReset
    →   SIBLING     seenParent&& (input_count>max_count+1)
                    && (input_ui==max_ui)
    →   RESET       otherwise
PARENT
    →   PARENT      ! allStable
    →   RESET       doReset || (seeParent&&(input_ui>last_max_ui)
                    && ! allPortsReset)
    →   ACTIVE      activeIn
    →   CHILD       seenParent && (input_ui>last_max_ui) &&
                    allPortsReset
    →   SIBLING     seenSibling&&(input_ui==max_ui)
    →   PARENT      otherwise
CHILD
    →   CHILD       ! allStable
    →   RESET       doReset || (seenParent&&(input_ui>last_
                    max_ui) && allPortsReset)
    →   SIBLING     seenSibling
    →   ACTIVE      childrenActive
SIBLING
    →   SIBLING     ! allStable
    →   IDLED       activeIn || seenIdled
    →   RESET       doReset || (seenParent&&(input_ui>last_max_ui)
                    && ! allPortsReset)
    →   PARENT      seenSibling&&(max_ui>input_ui)
    →   CHILD       seenParent&&(input_ui>last_max_ui)
                    && allPortsReset
```

As discussed above, the seen signals for node 4b correspond to signals which the ports 6a to 6d have received from other nodes 4a, 4c to 4f in the computer network 2 according to the IEEE 1394.2 specification. The value last_max_ui is the last value of max_ui when the global stable signal or "allStable" signal $P_{SG}$ was asserted.

It is understood that the above transitions and the states that the ports 8a to 8d may have and to which the port modules 12a to 12d correspond are for the preferred embodiment, namely a device 10 to control a node within a computer network 2 adhering to the IEEE 1394.2 specification. If the computer network 2 is designed to comply with another type of protocol and specification, the ports 8a to 8d and the port modules 12a to 12d will have correspondingly different states.

However, in all cases, the state of each port module 12a to 12d and the associated ports 8a to 8d will stay frozen and cannot change until the allStable signal $P_{SG}$ is received by the port modules 12a to 12d. This is shown in the state machine transitions for the state machines in port modules 12a to 12d by the RESET 35, PARENT 45, CHILD 55 and SIBLING 65 states remaining in that same state until the global allStable signal $P_{SG}$ is received. This is represented by the symbol "!allStable" keeping the port modules 12a to 12d in the states RESET 35, PARENT 45, CHILD 55 and SIBLING 65. Until this global allStable signal $P_{SG}$ is asserted by the port control logic 14, none of the state machines in port modules 12a to 12d will change.

If one of the ports 8a to 8d is receiving the identical unique identifier from the root node 4e, for example, ports 6a and 6b shown in FIG. 1, one of the port modules 12a and 12b could become disabled, such as by going to the IDLED 25 state. The port 8a or 8b which disables itself will be determined by comparing the port 8a and 8b to determine which port 8a or 8b satisfies a second set of predetermined conditions.

The second set of predetermined conditions can be any set of conditions to attempt to distinguish between the two ports 8a and 8b and disable one of them. The IEEE 1394.2 specification specifies that each port 6a to 6p in the computer network 2, in addition to transmitting the unique identifier which it has determined satisfies the first set of predetermined conditions, also transmits a hop-count representing the number of nodes 4a to 4f the port is separated from the root node 4e. For example, port 6i of node 4d will transmit the unique identifier 3000 and a hop-count of 1, indicating that port 6i is separated from the root node 4e by one node or hop, namely node 4d. Accordingly, the second set of predetermined conditions could be "disabling the ports in each node which are separated by the most nodes from the root node until only one port is receiving the unique identifier corresponding to the root node". For example, if port 6k is the highest priority port on node 4e, node 4f will be receiving the unique identifier 9000 through both ports 6p and 6n and will be transmitting the unique identifier also through ports 6p and 6n. However, port 6p will have a hop-count of 3 and port 6n will have a hop-count of 4, providing the result that port 6n will be disabled.

In the event that two ports in a node, for example ports 8a and 8b, are receiving the unique identifier of the root node and each port 8a and 8b is separated from the root node by the same number of nodes, a further condition need be set to the second set of predetermined conditions to determine which port will be disabled. This additional predetermined condition can be "disabling all of the ports except the port having the highest priority". In this example, port 8b will be disabled because port 8a has the highest priority.

Figure 4:
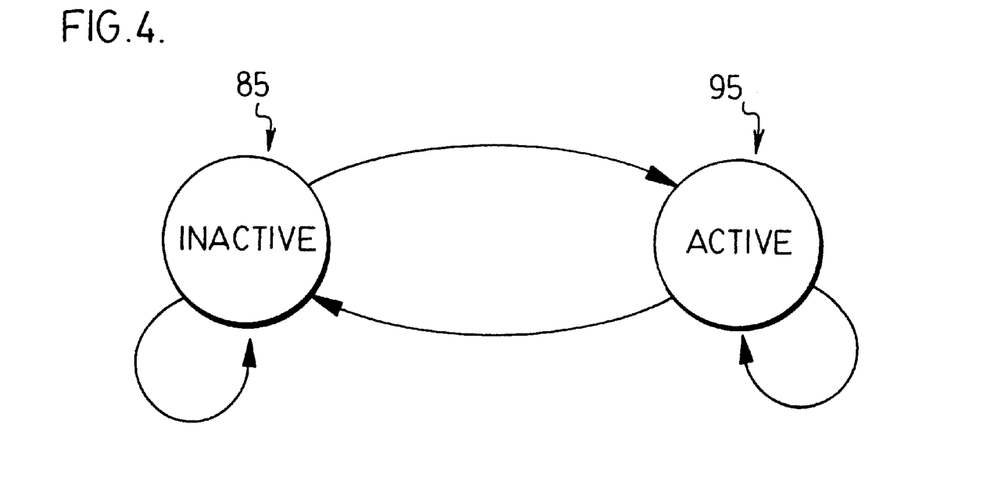
FIG. 4 shows a finite state machine algorithm for the node device according to one embodiment of the present invention.

Once the parent signal has passed through all of the port modules 12a to 12d, the allPortsReset signal is asserted, usually by the lowest priority port module 12d. The allPortsReset signal is received by the node finite state machine (FSM) 20. The state transitions for the node FSM 20 are shown in FIG. 4. In a preferred embodiment, where the device 10 is operating to control a computer network 2 adhering to the IEEE 1394.2 specification, the transitions for the node FSM 20 will be as follows:

| INACTIVE 85 | |
|---|---|
| ⇒ ACTIVE 95 | allPortsReset AND allStable AND ((own_ui==max_ui) OR ((own_ui ! =max_ui) AND (seenActive[0] OR seenActive [1] OR . . . OR seenActive [N]))) |
| ⇒ INACTIVE 85 | otherwise |
| ACTIVE 95 | |
| ⇒ INACTIVE 85 | doReset OR seenReset[0] OR seenReset [1] OR . . . OR seenReset [N] |
| ⇒ ACTIVE 95 | otherwise | where allPortsReset is the signal emanating from the lowest priority module 12d in response to the parent signal, allStable corresponds to the global allStable signal $P_{SG}$ from the port control logic 14 and the seenActive [N] corresponds to one of the four ports 8a to 8d having seen an active signal on the computer network 2. Likewise, seenReset [N] corresponds to the seenReset signal sent by one of the four ports 8a to 8d having seen a reset signal. These seenActive [N] and seenReset signals [N] are signals received by the port from other nodes as described in the IEEE 1394.2 specification.

If the node FSM 20 is in an active state 95, it will generate an active signal which passes through the port modules 12a to 12d. In the preferred embodiment, where the port modules 12a to 12d are connected in a daisy chain 11, the active signal passes through the port modules 12a to 12d as an "active" token. While the port modules 12a to 12d have the "active" token, the port modules can transmit an activeIn signal to other nodes in the computer network 2. An activeIn signal is a signal on the computer network 2 which allows a port of a node below the node in the computer network 2 to become active, as shown in the state transitions above and illustrated in FIG. 3. Ports which are in the IDLED state 25 have been disabled and will not be activated. Once the active signal passes through all of the port modules 12a to 12d, the allChildrenActive signal is asserted, generally by the lowest priority port module 12d, indicating that all of the children below node 4b have been activated.

The embodiment of the device 10 shown in FIG. 2 further comprises root determining units, shown by reference numerals 22a to 22d, in each of the port modules 12a to 12d. The root determining units 22a to 22d determine if the node 4b within which the device 10 is located is the root node. This determination is made by comparing the unique identifier which all of the port modules 12a to 12d have determined satisfy the first set of predetermined conditions, represented by the signals max_ui when the port modules 12a to 12d are stable, corresponding to the unique identifier of the node 4b containing the device 10. If this condition is met, (represented by max ui=own_ui) in the state transitions above, the port modules 12a to 12d will use this information to perform the correct state transition.

Figure 5:
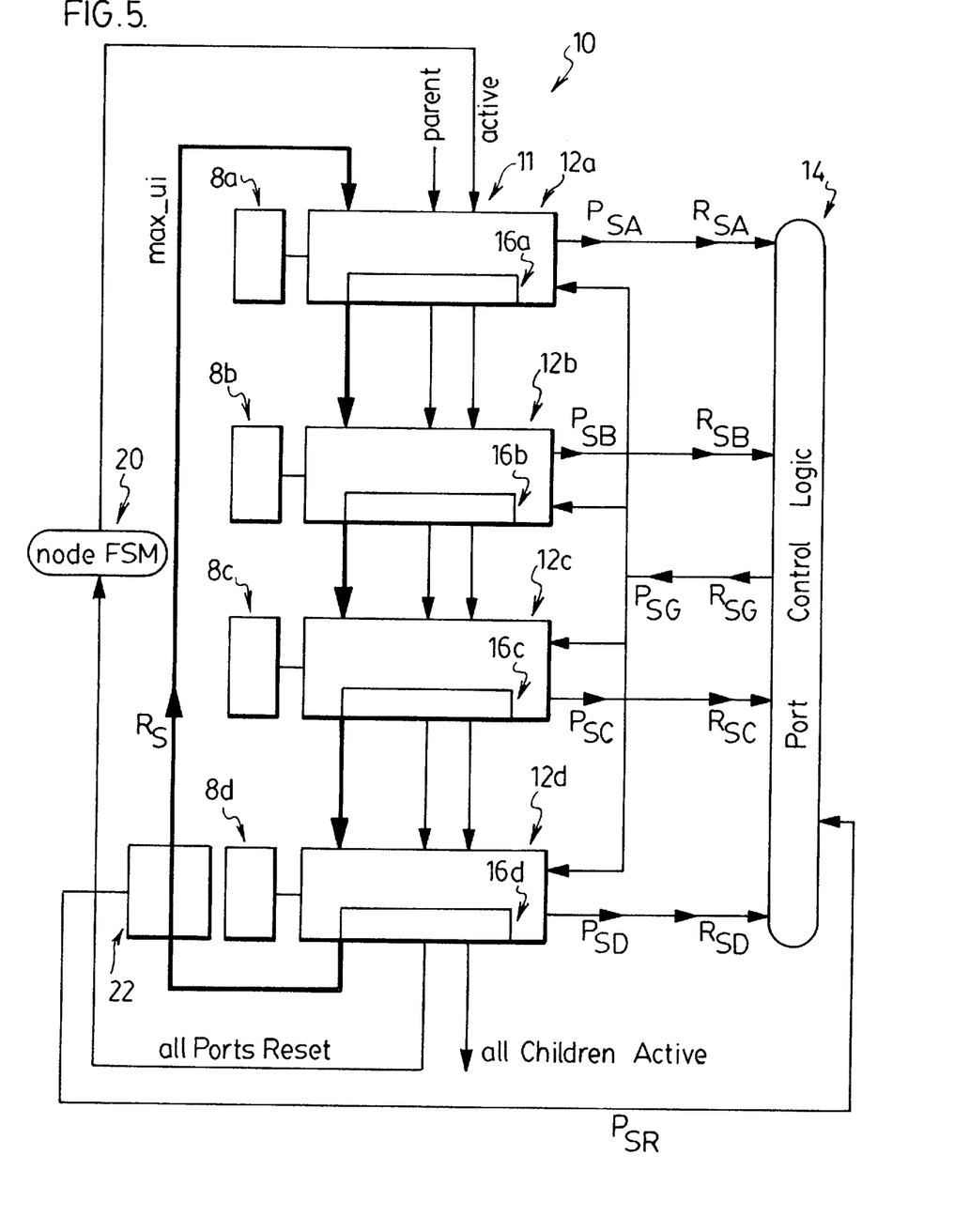
FIG. 5 shows a top-level architecture of a 4-port implementation of a device according to a further embodiment of the present invention.

FIG. 5 shows a further embodiment of the present invention where the root determining means, shown generally by reference numeral 22, is located remotely from the port modules 12a to 12d. The root determining unit 22 determines if the value represented by the signals max_ui correspond to the unique identifier of the node 4b within which the device 10 is located. If this condition is not satisfied, the root determining unit 22 does not take any further action. If this condition is satisfied, the root determining unit 22 sends a root signal $R_S$ along with the max_ui signals to each of the port modules 12a to 12d to confirm the node 4b is the root node. If the root signal $R_S$ returns to the root determining means 22 and the max_ui signal has not changed, then the root determining unit 22 can determine that the node 4b within which the device 10 is located is the root node.

The root determining unit 22 in the embodiment shown in FIG. 5 further comprises a root stable signal $P_{SR}$ which is sent to the port control logic 14 indicating that the root determining unit 22 is stable. The root determining unit 22 sends the root stable signal $P_{SR}$ at all times except when the root determining unit 22 has sent the root signal $R_S$ and is awaiting receipt of the root signal $R_S$. Accordingly, in this embodiment, the port control logic 14 will not send the global allStable signal $P_{SG}$ until the portStable signal $P_{SA}$, $P_{SB}$, $P_{SC}$, $P_{SD}$ from each of the port modules 12a to 12d is received and the root stable signal $P_{SR}$ is also received. This ensures that the port control logic 14 will not send the global allStable signal $P_{SG}$ while the root determining unit 22 is confirming the node is the root node.

In the embodiment shown in FIG. 5, the signals own_ui need not be sent to the lower priority port modules 12a to 12d, which saves space and decreases cost of manufacturing the device 10 because those lines are not necessary. The highest priority port module 12a will compare the unique identifier it receives against a predetermined unique identifier, as 0 or its own unique identifier. This predetermined unique identifier could be stored in the highest priority port module 12a or initially sent on the max_ui signals.

The ports 6a to 6p preferably are bi-directional ports. However, the ports could also be uni-directional ports (not shown) which can either receive or transmit information, but in this case, there will generally be two unidirectional ports to transmit information to and from separate nodes (not shown). Accordingly, while reference will be made to bi-directional ports, such as ports 6a to 6p, it is understood that the scope of the present invention is not limited to bi-directional ports 6a to 6p and could comprise pairs of uni-directional ports (not shown) to transmit information bi-directionally.

It is understood that the signals sent within the node 4, such as the global allStable signal $P_{SG}$ sent by the port control logic 14, can have an asserted and de-asserted state, as disclosed, or can comprise two separate signals. For example, the allStable signal $P_{SG}$ can be two separate signals, such as global allStable signal $P_{SG}$ and a global unstable signal (not shown), which are each asserted to indicate that the port modules 12a to 12d are all stable or all unstable, respectively.

It will be understood that the unique identifier need not be a number, but could be any combination of symbols, including numbers, which can uniquely identify the nodes 4a to 4f. Generally, the unique identifier will be programmed into the nodes 4a to 4f at the time of manufacture. To decrease the changes that two nodes 4a to 4f in a computer network 2 have the same unique identifier, the unique identifier is preferably a large binary number. For example, the IEEE 1394.2 specification accommodates a unique identifier which is 68 bits wide.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are electrical, functional or mechanical equivalents of the specific embodiments and features that have been described and illustrated herein.

I claim:

1. In a computer network comprising a plurality of interconnected nodes, each node having ports for receiving and transmitting information to ports of other nodes, each port in each node having a port module associated therewith, each port module in a node having a priority in the node, each node in the network having a unique identifier which is transmitted by each node during reset of the computer network, a process for identifying which ports in one of the plurality of interconnected nodes can be disabled during reset of the network, said process comprising the steps of:

(a) for each port module in said one of the nodes, commencing with the port module having the highest priority in said one of the nodes;

(i) determining, between a predetermined unique identifier and a unique identifier being received by the port from other nodes, which unique identifier satisfies a first set of predetermined conditions;

(ii) transmitting, from the port to other nodes, the unique identifier which has been determined by the associated port module satisfies the first set of predetermined conditions for the port;

(iii) sending to the next highest priority port module in the node the unique identifier which has been determined by the port module to satisfy the first set of predetermined conditions;

(iv) determining, between the unique identifier sent from the higher priority port module of said one of the nodes and a unique identifier being received by the port associated with the next highest priority port module of said one of the nodes, which unique identifier satisfies the first set of predetermined conditions; and (v) repeating steps (ii) to (iv) for each port module in said one of the nodes in the order of priority until each port of said one of the nodes is transmitting an identical unique identifier number that satisfies the first set of predetermined conditions, said identical unique identifier being transmitted by each port corresponding to a root node of the plurality of nodes;

(b) for each port that is receiving the identical unique identifier from the root node, disabling one of the ports receiving the identical unique identifier from the root node.

2. The process as defined in claim 1 wherein step (b) comprises the steps of:

for each port that is receiving the identical unique identifier from the root node, (i) comparing the ports of each node to determine which ports of each node satisfies a second set of predetermined conditions; and (ii) disabling the ports of each node which do not satisfy the second set of predetermined conditions.

3. The process as defined in claim 1 wherein step (b) comprises the steps of:

for each port of said one of the nodes that is receiving the identical unique identifier from the root node, (i) determining by how many nodes each port is separated from the root node; and (ii) disabling the ports in said one of the nodes which are separated by the most nodes from the root node until only one port is receiving the identical unique identifier from the root node.

4. The process as defined in claim 3 further comprising the step of:

for each port which is receiving the unique identifier from the root node and is separated by the same number of nodes from the root node, disabling each of the ports receiving the unique identifier from the root node except the port having the highest priority.

5. The process as defined in claim 1 wherein the predetermined unique identifier is the unique identifier of said one of the nodes such that in step (a)(i) the port module having the highest priority in said one of the nodes determines, between the unique identifier of said one of the nodes and the unique identifier being received by the highest priority port module from other nodes, which unique identifier satisfies the first set of predetermined conditions; and wherein step (a)(v) further comprises the step of determining said one of the nodes is the root node by determining if the unique identifier of said one of the nodes is equal to the identical unique identifier being transmitted by each port of said one of the nodes.

6. The process as defined in claim 5 wherein the port module for the lowest priority node sends the unique identifier which the lowest priority port module has determined satisfies the first set of predetermined conditions to the highest priority port module and the lowest priority port module is the next highest priority port module for the highest priority port module so that the port modules can repeatedly compare, in the predetermined priority, the unique identifiers being received by their associated ports with the unique identifier which has thus far been determined to satisfy the first set of predetermined conditions.

7. The process as defined in claim 6 wherein said one of the nodes comprises port control means connected to each of said port modules for sending and receiving control signals to said port modules, said process further comprising the steps of:

upon occurrence of an event causing said one of the nodes to reset, sending from the port control means to each of the port modules a global reset signal; and upon receipt of the global reset signal, transmitting the unique identifier of said one of the nodes from each port of said one of the nodes and step (a) is executed in response to the global reset signal.

8. The process as defined in claim 7 further comprising the steps of:

when one of the port modules receive a signal indicating the occurrence of an event which causes the node to reset, sending a reset signal from the port module which received the signal to the port control means; and wherein the port control means sends the global reset signal to all of the port modules in response to a reset signal from one of the port modules.

9. The process as defined in claim 8, further comprising the steps of:

for each port module, comparing the unique identifier received from an immediately previous port module to the unique identifier sent by the port module to the next port module in the predetermined priority;

for each port module, sending a stable signal to the port control means when the unique identifier received from an immediately previous port module equals the unique identifier the port module sends to the next highest priority port module; and when the port control means is receiving stable signals from all of the port modules, sending a global allStable signal to all of the port modules indicating to the port modules that each port of said one of the nodes is transmitting the same unique identifier that satisfies the first set of predetermined conditions so that step (b) can be executed.

10. A device for controlling a node, said node being one node in a computer network comprising a plurality of interconnected nodes, each node in the network having ports for receiving and transmitting information to ports of other nodes, each node in the network hang a unique identifier which each node transmits during reset of the computer network, said node having N-ports where N is an integer greater than or equal to one, said device comprising:

N-port modules, each port module associated with one port of the node for controlling reception and transmission of information through the associated port to other nodes, each port module in the node having a predetermined priority commencing with a highest priority port module;

wherein, upon occurrence of an event causing the node to reset, the port module having the highest predetermined priority compares a predetermined unique identifier to the unique identifier being received by its associated port to determine which unique identifier satisfies a first set of predetermined conditions;

wherein the highest priority port module sends to the port module having the next highest priority the unique identifier which the highest priority port module has determined satisfies the first set of predetermined conditions;

wherein each port module, in the predetermined priority, successively receives the unique identifier which the higher priority port module within the node determined satisfies the first set of predetermined conditions and compares the unique identifier received from the higher priority port module to the unique identifier being received by the port associated with the port module to determine which satisfies the first set of predetermined conditions; and wherein the port modules repeatedly compare, in the predetermined priority, the unique identifier received by their associated ports with the unique identifier received from the higher priority port module, until all the port modules have determined an identical unique identifier which satisfies the first set of predetermined conditions, said identical unique identifier corresponding to a root node of the plurality of nodes.

11. The device as defined in claim 10 further comprising:

port control means connected to each of said port modules for sending and receiving control signals to said port modules;

wherein when one of the port modules receives a signal indicating the occurrence of an event causing the node to reset, the port module which received the signal sends a reset signal to the port control means; and wherein the port control means sends a global reset signal to each of the port modules in response to receipt of a reset signal from one of the port modules.

12. The device as defined in claim 11 wherein, upon receipt of the global reset signal, each port module causes its associated port to transmit the unique identifier of the node, and, the highest priority port module commences comparing the predetermined unique identifier to the unique identifier being received by its associated port in response to the global reset signal.

13. The device as defined in claim 12 wherein each port module comprises communication means for sending to a next port module in the predetermined priority the unique identifier which the port module has determined satisfies the first set of predetermined conditions; and wherein the port module having the lowest priority sends the unique identifier which the lowest priority port module has determined satisfies the first set of predetermined conditions to the highest priority port module and lowest priority port module is the next highest priority port module for the highest priority port module so that the port modules can repeatedly compare, in the predetermined priority, the unique identifiers being received by their associated ports with the unique identifier which the port modules have previously determined satisfy the first set of predetermined conditions.

14. The device as defined in claim 13 wherein the predetermined unique identifier is the unique identifier of the node such that the highest priority port module compares the unique identifier of the node with the unique identifier being received by the port associated with the highest priority port module to determine whether the node or one of the unique identifiers being received by the port associated with the highest priority port module satisfies the first set of predetermined conditions.

15. The device as defined in claim 14 wherein if more than one port of the node is receiving the identical unique identifier from the root node, one of the port modules associated with the ports receiving the identical unique identifier from the root node which does not satisfy a second set of predetermined conditions will become disabled.

16. The device as defined in claim 14 wherein each port module sends to the next port module in the predetermined priority a hop-count indicating the number of nodes which separate the associated port from the root node; and wherein, if more than one port is receiving the identical unique identifier from the root node, all of the port modules receiving the identical unique identifier from the root node will become disabled except for the port module having the fewest number of nodes separating its associated port from the root node represented by having the lowest hop-count.

17. The device as defined in claim 16 wherein, for each port module having an associated port which is receiving the unique identifier from the root node and is separated by the same number of nodes, each port module will become disabled except for the port module having the highest priority.

18. The device as defined in previous claim 13 wherein, while the port modules compare the unique identifiers, each port module causes its associated port to transmit the unique identifier which the port module has thus far determined satisfies the first set of predetermined conditions.

19. The device as defined in claim 10 wherein the device can be manufactured by replicating N substantially identical port modules, one port module for each port of the node to be controlled.

20. The device as defined in claim 14 wherein each port module sends a stable signal to the port control means when the unique identifier received from the immediately higher priority port module equals the unique identifier sent by the port module to the next highest priority port module in the predetermined priority;

wherein when the port control means is receiving stable signals from all of the port modules, the port control means sends a global allStable signal to all of the port modules; and wherein each of said port modules have states which correspond to states of the associated ports in the network, said states comprising an idled state wherein the port module becomes disabled, and said port modules can change state only in response to the global allStable signal.

21. The device as claimed in claim 20 wherein each port module comprises root determining means for determining if the node is the root node by determining if the identical unique identifier which satisfies the first set of predetermined conditions corresponds to the unique identifier of the node.

22. The device as claimed in claim 20 further comprising root determining means located remotely from the port modules for determining if the node is the root node by determining if the identical unique identifier which satisfies the first set of predetermined conditions corresponds to the unique identifier of the node;

wherein the root determining means sends a root signal to the port modules to confirm the node is the root node;

wherein the root determining means sends a root stable signal to the port control means indicating the root determining means is stable; and wherein said root determining means does not send the root stable signal when the root determining means is confirming the node is the root node, and, the port control means sends the global stable signal to all of the port modules when the port control means is receiving stable signals from all of the port modules and the root stable signal from the root determining means.

23. The device as defined in claim 14 wherein the port modules are connected in a daisy chain configuration.

24. The device as defined in claim 20 comprising parent signal means for passing a parent signal successively through each port in the predetermined priority, said port modules can change states in response to the global allStable signal and when the port module has the parent signal; and wherein the lowest port module asserts an allPortsReset signal after the parent signal has passed through the lowest priority port module.

25. The device as defined in claim 24 further comprising:

active signal generation means for generating and passing an active signal successively through each port module in the predetermined priority in response to the global allStable signal and the allPortsReset signal, said port modules can transmit an activeIn signal to other nodes when the port module has the active signal; and wherein the lowest port module asserts an allChildrenActive signal after the active signal has passed through the lowest priority port module indicating that all nodes below the node in the network have been activated.

26. In a computer network comprising a plurality of interconnected nodes, each node having ports for receiving and transmitting information to ports of other nodes, each port in each node having a port module associated therewith, each port module in a node having a priority in the node, each node in the network having a unique identifier which is transmitted by each node during reset of the computer network, a process for identifying which ports in a node can be disabled while maintaining an active connection between each node in the network, said process comprising the steps of:

(a) for each node,
  (i) determining, between the unique identifier of the node and a unique identifier being received by the highest priority port module from other nodes, which unique identifier satisfies a first set of predetermined conditions;
  (ii) transmitting from the port to other nodes the unique identifier which has been determined by the associated port module satisfies the first set of predetermined conditions;
  (iii) sending to the next highest priority port module in the node the unique identifier which has been determined by the port module to satisfy the first set of predetermined conditions;
  (iv) determining, between the unique identifier sent from the higher priority port module of the node and a unique identifier being received by the port associated with the next highest priority port module of the node, which unique identifier satisfies the first set of predetermined conditions; and
  (v) repeating steps (ii) to (iv) for each port module in the order of priority until each port of the node is transmitting an identical unique identifier number that satisfies the first set of predetermined conditions;
(b) for each node, repeating step (a) until an identical unique identifier is transmitted by each port of each node, said identical unique identifier being transmitted by each port of each node corresponding to a root node of the plurality of nodes; and
(c) for each node that is receiving the identical unique identifier from the root node by more than one port, disabling ports receiving the identical unique identifier from the root node until only one port in each node is receiving the identical unique identifier from the root node.

* * * * *